United States Patent
Lai et al.

(10) Patent No.: US 11,933,945 B2
(45) Date of Patent: Mar. 19, 2024

(54) OPTICAL LENS

(71) Applicant: Rays Optics Inc., Hsinchu County (TW)

(72) Inventors: Ching-Lung Lai, Hsinchu County (TW); Ying-Hsiu Lin, Hsinchu County (TW); Chen-Cheng Lee, Hsinchu County (TW)

(73) Assignee: RAYS OPTICS INC., Hsinchu County (TW)

( * ) Notice: Subject to any disclaimer, the term of this patent is extended or adjusted under 35 U.S.C. 154(b) by 115 days.

(21) Appl. No.: 17/223,615

(22) Filed: Apr. 6, 2021

(65) Prior Publication Data
US 2022/0214523 A1  Jul. 7, 2022

(30) Foreign Application Priority Data
Jan. 7, 2021 (TW) .................................. 110100656

(51) Int. Cl.
G02B 13/00  (2006.01)
G02B 9/10   (2006.01)
G02B 13/06  (2006.01)

(52) U.S. Cl.
CPC ............. *G02B 13/003* (2013.01); *G02B 9/10* (2013.01); *G02B 13/06* (2013.01)

(58) Field of Classification Search
CPC .......... G02B 9/10; G02B 9/62; G02B 13/003; G02B 13/0045; G02B 13/06
See application file for complete search history.

(56) References Cited

U.S. PATENT DOCUMENTS
9,176,300 B2  11/2015  Chen

FOREIGN PATENT DOCUMENTS

| TW | I337262 B | 2/2011 |
|---|---|---|
| TW | I479190 B | 4/2015 |
| TW | I596374 B | 8/2017 |

*Primary Examiner* — Jack Dinh
(74) *Attorney, Agent, or Firm* — Muncy, Geissler, Olds & Lowe, P.C.

(57) ABSTRACT

An optical lens includes a first lens group and a second lens group. The first lens group has at least two lenses that include at least one aspheric lens, the second lens group has at least four lenses that includes at least one aspheric lens, and a total number of lenses with refractive powers in the optical lens is smaller than nine. The first and the second lens groups include a first lens, a second lens, a third lens, a fourth lens, a fifth lens and a sixth lens in order from the magnified side to the minified side. The first lens to the sixth lens have respective refractive powers of negative, negative, positive, positive, negative and positive.

15 Claims, 6 Drawing Sheets

OPTICAL LENS

BACKGROUND OF THE INVENTION a. Field of the Invention

The invention relates generally to an optical system, and more particularly to an optical lens.

b. Description of the Related Art

Recent advances in technology have led to the development of various types of optical lenses. For example, an image pick-up lens used in autonomous-vehicle cameras or machine vision judgment appliances is a commonly used optical lens. Nowadays, there is a growing need for the image pick-up lens to meet various requirements such as high optical performance. To meet these requirements, the optical lens needs to have, for example, low fabrication costs, high resolution, large effective aperture, low thermal drift and wide viewing angles. Therefore, it is desirable to provide an optical lens that may achieve lower fabrication costs, wider viewing angles, lower thermal drift and better imaging quality.

BRIEF SUMMARY OF THE INVENTION

According to one aspect of the present disclosure, an optical lens includes a first lens group and a second lens group arranged in order from a magnified side to a minified side and divided at a position of a minimum inner diameter of a lens barrel. The first lens group has at least two lenses that include at least one aspheric lens, the second lens group has at least four lenses that includes at least one aspheric lens, the second lens group has a positive refractive power, and a total number of lenses with refractive powers in the optical lens is smaller than nine. The first and the second lens groups include a first lens, a second lens, a third lens, a fourth lens, a fifth lens and a sixth lens in order from the magnified side to the minified side. The first lens to the sixth lens have respective refractive powers of negative, negative, positive, positive, negative and positive. The first lens is a glass lens and closest to the magnified side, the second lens is an aspheric lens, and the sixth lens is an aspheric lens and closest to the minified side.

According to another aspect of the present disclosure, an optical lens includes a first lens group, an aperture stop and a second lens group arranged in order from a magnified side to a minified side. The first lens group has at least one glass lens and an aspheric lens in order from the magnified side to the minified side, the second lens group has at least four lenses that includes at least one aspheric lens, the second lens group has a positive refractive power, and a total number of lenses with refractive powers in the optical lens is smaller than nine. The optical lens satisfies one of the following conditions:

$$4 \text{ mm} < DL < 8 \text{ mm}, LT < 15 \text{ mm and } 0.4 < DL/LT < 0.8; \tag{1}$$

$$D1 < 10 \text{ mm}, LT < 15 \text{ mm and } 0.5 < D1/LT < 1.5, \tag{2}$$

where D1 is a lens diameter of a lens of the optical lens closest to the magnified side, DL is a lens diameter of a lens of the optical lens closest to the minified side, and LT is a distance between an optical center of a magnified-side surface of the lens closest to the magnified side and an optical center of a minified-side surface of the lens closest to the minified side.

According to another aspect of the present disclosure, an optical lens includes a first lens group, an aperture stop and a second lens group arranged in order from a magnified side to a minified side. The first lens group has at least one glass lens and an aspheric lens in order from the magnified side to the minified side, the second lens group has at least four lenses that includes at least one aspheric lens, the second lens group has a positive refractive power, and a total number of lenses with refractive powers in the optical lens is smaller than nine. The optical lens satisfies one of the following conditions:

$$D1 < 10 \text{ mm}, 4 \text{ mm} < DL < 8 \text{ mm and } 1 < D1/DL < 2; \tag{1}$$

$$1 \text{ mm} < EFL < 2 \text{ mm}, D1 < 10 \text{ mm}, LT < 15 \text{ mm and } 0.15 < EFL/LT < 0.25, \tag{2}$$

where EFL is an effective focal length of the optical lens, D1 is a lens diameter of a lens of the optical lens closest to the magnified side, DL is a lens diameter of a lens of the optical lens closest to the minified side, and LT is a distance between an optical center of a magnified-side surface of the lens closest to the magnified side and an optical center of a minified-side surface of the lens closest to the minified side.

According to the above embodiments, the optical lens may achieve good imaging quality, wide viewing angles, wide operating temperature ranges and low fabrication costs.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.). The following embodiments of a zoom lens may be applied to any system or environment according to actual demands.

In an imaging system, a magnified side may refer to one side of an optical path of an optical lens comparatively near a subject to be picked-up, and a minified side may refer to other side of the optical path comparatively near a photosensor.

Figure 1:
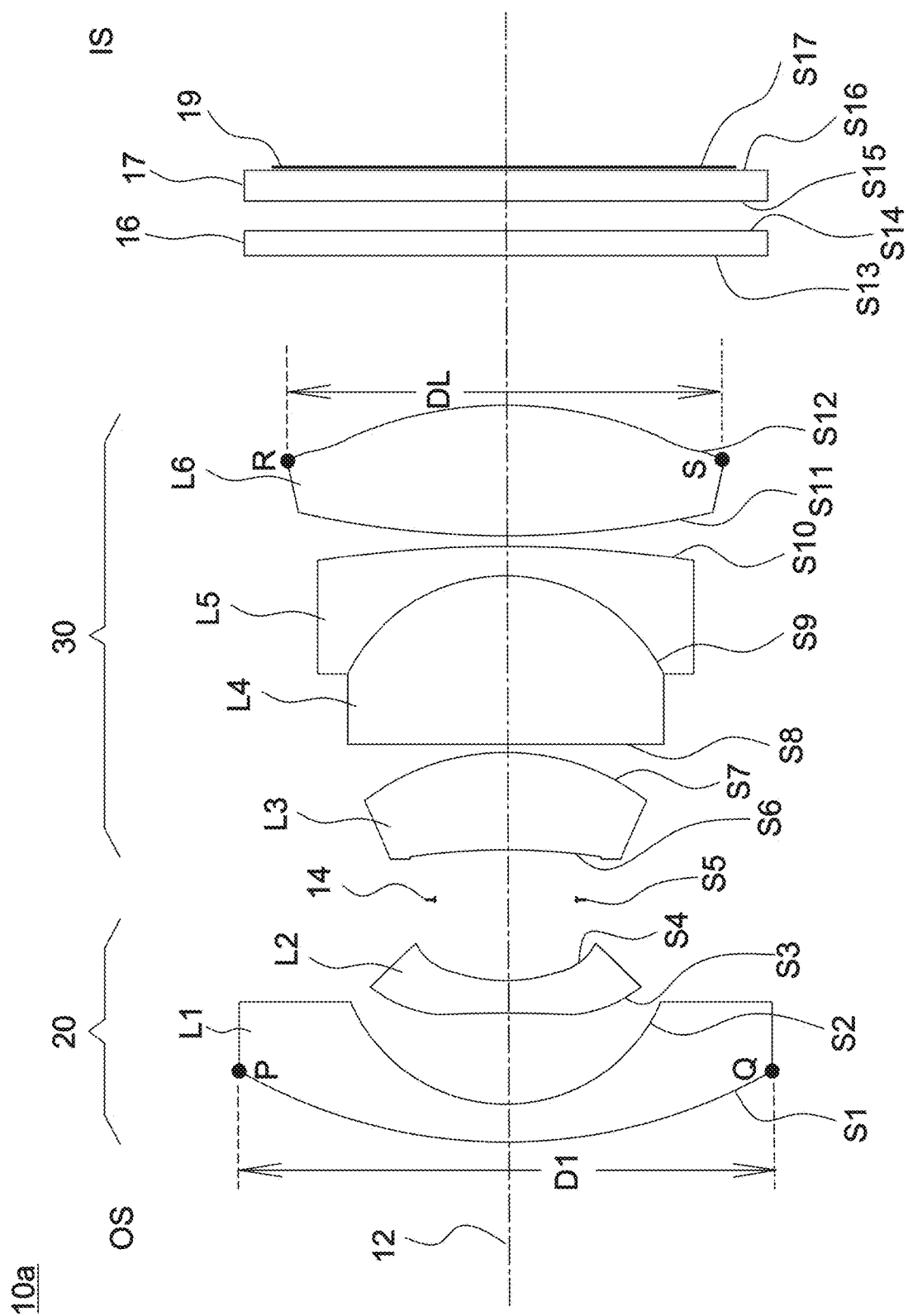
FIG. 1 shows a cross-sectional illustration of an optical lens according to a first embodiment of the invention.

A certain region of an object side surface (or an image side surface) of a lens may be convex or concave. Herein, a convex or concave region is more outwardly convex or inwardly concave in the direction of an optical axis as compared with other neighboring regions of the object/image side surface FIG. 1 shows a cross-sectional illustration of an optical lens according to a first embodiment of the invention. As shown in FIG. 1, in this embodiment, the optical lens 10a has a lens barrel (not shown), and inside the lens barrel a first lens L1, a second lens L2, an aperture stop 14, a third lens L3, a fourth lens L4, a fifth lens L5 and a sixth lens L6 are arranged in order from a first side (magnified side OS or object side) to a second side (minified side IS or image side). In this embodiment, the first lens L1, the second lens L2, the third lens L3, the fourth lens L4, the fifth lens L5 and the sixth lens L6 have negative, negative, positive, positive, negative and positive refractive powers, respectively. The first lens L1 and the second lens L2 form a first lens group 20 (such as a front lens group) with a negative refractive power, and the third lens L3, the fourth lens L4, the fifth lens L5 and the sixth lens L6 form a second lens group 30 (such as a rear lens group) with a positive refractive power. In one embodiment, the first lens group 20 and the second lens group 30 are divided at a position of a minimum inner diameter of a lens barrel accommodating the lens groups 20 and 30 (such as the position of an aperture stop). Further, the minified side IS is disposed with a light filter 16, a cover glass 17 and a photosensor (not shown), an image plane (visible-light focal plane) of the optical lens 10a formed at an effective focal length for visible light is labeled as 19, and the light filter 16 is disposed between the second lens group 30 and the image plane 19. In this embodiment, the second lens L2 and the sixth lens L6 are aspheric lenses. The optical lens according to an embodiment of the invention may include at least one glass lens and at least one plastic lens. In this embodiment, the first lens L1 and the third lens L3 of the optical lens 10a are glass lenses. Further, adjoining surfaces of each two adjacent lenses may have an identical radius of curvature or a similar radius of curvature to form a compound lens (such as a cemented lens, a doublet lens, a triplet lens or even higher number lens configurations). In one embodiment, the ratio of a difference in radius of curvature between each two adjoining lens surfaces of a compound lens to the larger value of radius of curvature among the two adjoining lens surfaces is smaller than 0.1%. In this embodiment, the fourth lens L4 and the fifth lens L5 are fit together to form a cemented doublet, but the invention is not limited thereto. Further, in each of the following embodiments, the magnified side OS is located on the left side and the minified side IS is located on the right side of each figure, and thus this is not repeatedly described in the following for brevity.

The aperture stop 14 is an independent component or integrally formed with other optical element. In this embodiment, the aperture stop may use a mechanic piece to block out peripheral light and transmit central light to achieve aperture effects. In one embodiment, the position of a minimum inner diameter of a lens barrel is defined by the aperture stop. The mechanic piece may be adjusted by varying its position, shape or transmittance. In other embodiment, the aperture stop may be formed by applying an opaque or a light-absorbing material on a lens surface except for a central area to block out peripheral light and transmits central light.

Each lens may be assigned a parameter of "lens diameter", and the "lens diameter" is defined by a distance between outermost turning points of the optical lens at each end of the optical axis 12. For example, as shown in FIG. 1, the magnified-side surface of the first lens L1 (the lens closest to the magnified side OS among all lenses of the optical lens) has two opposite turning points P and Q (outermost turning points) that are spaced at a distance measured in a direction perpendicular to the optical axis 12, and such distance is referred to as a lens diameter D1 of the lens L1. Besides, the minified-side surface of the sixth lens L6 (the lens closest to the minified side IS among all lenses of the optical lens) has two opposite turning points R and S (outermost turning points) that are spaced at a distance measured in a direction perpendicular to the optical axis 12, and such distance is referred to as a lens diameter DL of the sixth lens L6. In this embodiment, the first lens L1 has a lens diameter D1 of 7.12 mm, and the sixth lens L6 has a lens diameter DL of 5.84 mm.

A spherical lens indicates its front lens surface and rear lens surface are each a part surface of a sphere having a fixed radius of curvature. In comparison, an aspheric lens indicates at least one of its front lens surface and rear lens surface has a radius of curvature that varies along a center axis to correct abbreviations. Detailed optical data, design parameters and aspheric coefficients of the optical lens 10a are shown in Tables 1 and 2 below. In the following design examples of the invention, each aspheric surface satisfies the following equation:

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + \ldots,$$

where Z denotes a sag of an aspheric surface along the optical axis 12, c denotes a reciprocal of a radius of an osculating sphere, K denotes a Conic constant, r denotes a height of the aspheric surface measured in a direction perpendicular to the optical axis 12, and parameters A-G are 4th, 6th, 8th, 10th, 12th, 14th and 16th order aspheric coefficients. Note the data provided below are not used for limiting the invention, and those skilled in the art may suitably modify parameters or settings of the following embodiment with reference of the invention without departing from the scope or spirit of the invention.

TABLE 1

EFL: 1.84 mm
F#: 2
full FOV: 179 degrees
TTL: 12.5 mm
semi-diagonal image height: 3.088 mm
D1: 7.12 mm
DL: 5.84 mm
LT: 9.8 mm
DL/LT: 0.6
EFL/LT: 0.19

| Surface | Radius (mm) | Interval (mm) | Refractive index | Abbe number | Object description |
|---|---|---|---|---|---|
| 1 | 7.15 | 0.50 | 1.80 | 47 | meniscus (L1) |
| 2 | 2.23 | 1.19 | | | |

TABLE 1-continued

EFL: 1.84 mm
F#: 2
full FOV: 179 degrees
TTL: 12.5 mm
semi-diagonal image height: 3.088 mm
D1: 7.12 mm
DL: 5.84 mm
LT: 9.8 mm
DL/LT: 0.6
EFL/LT: 0.19

| Surface | Radius (mm) | Interval (mm) | Refractive index | Abbe number | Object description |
|---|---|---|---|---|---|
| 3* | −7.66 | 0.50 | 1.54 | 56 | aspheric (L2) |
| 4* | 6.05 | 1.02 | | | |
| 5 | Inf. | 0.57 | | | aperture stop 14 |
| 6 | −63.90 | 1.41 | 1.99 | 30 | meniscus (L3) |
| 7 | −3.01 | 0.10 | | | |
| 8 | Inf. | 2.24 | 1.75 | 52 | plano-convex (L4) |
| 9 | −2.39 | 0.40 | 1.99 | 16 | meniscus (L5) |
| 10 | −17.81 | 0.16 | | | |
| 11* | 17.45 | 1.71 | 1.54 | 56 | aspheric (L6) |
| 12* | −3.43 | 2.05 | | | |
| 13 | Inf. | 0.30 | 1.52 | 64 | light filter 16 |
| 14 | Inf. | 0.40 | | | |
| 15 | Inf. | 0.40 | 1.52 | 64 | cover glass 17 |
| 16 | Inf. | 0.05 | | | |
| 17 | Inf. | 0.00 | | | image plane 19 |

In the above Table 1, an interval of the surface S1 is a distance between the surface S1 and the surface S2 along the optical axis 12, an interval of the surface S2 is a distance between the surface S2 and the surface S3 along the optical axis 12, and an interval of the surface S16 is a distance between the surface S16 and the image plane 19 along the optical axis 12.

In the above table 1, the surface denoted by an asterisk is an aspheric surface, and a surface without the denotation of an asterisk is a spherical surface.

A total track length of the optical lens 10a is denoted as "TTL" in the above table. Specifically, the total track length TTL is a distance along the optical axis 12 between a lens surface S1 closest to the magnified side and the image plane S19. In this embodiment, the total track length TTL of the optical lens 10a is smaller than or equal to 13 mm.

When the optical lens is used in an image pick-up system, an image circle diameter refers to a diagonal length of an image on an image plane, and a semi-diagonal image height equals half of the image circle diameter. In one embodiment, a semi-diagonal image height is 3.08-3.088 mm, and an effective focal length EFL is 1.80-1.85 mm.

Table 2 lists aspheric coefficients and conic constant of each aspheric surface of the optical lens 10a according to the first embodiment of the invention.

TABLE 2

| Surface | S3 | S4 | S11 | S12 |
|---|---|---|---|---|
| K | 0 | 0 | 0 | 0 |
| A | 1.17E−01 | 1.63E−01 | −3.54E−04 | 1.09E−02 |
| B | −5.48E−02 | −5.04E−02 | 3.73E−04 | −5.75E−04 |
| C | 2.50E−02 | 1.73E−02 | 2.92E−04 | 4.41E−04 |
| D | −7.54E−03 | 3.43E−02 | −9.54E−05 | −6.20E−05 |
| E | 1.35E−03 | −3.17E−02 | 1.13E−05 | 2.77E−06 |
| F | −1.08E−04 | 1.15E−02 | −5.41E−07 | −3.32E−08 |

The radius of curvature is a reciprocal of the curvature. When a lens surface has a positive radius of curvature, the center of the lens surface is located towards the minified side. When a lens surface has a negative radius of curvature, the center of the lens surface is located towards the magnified side. The concavity and convexity of each lens surface is listed in each table and shown in corresponding figures.

The Symbol F/# shown in the above table is an F-number. When the optical lens is used in an image pick-up system, the image plane is a sensing surface of a photosensor. In one embodiment, an F-number of the optical lens is smaller than or equal to 2.0.

A full field of view is a light collection angle of the optical surface S1 closest to the magnified side and is measured diagonally. In one embodiment, the full field of view (FOV) is in the range between 170 degrees and 196 degrees. In another embodiment, the full field of view is in the range between 175 degrees and 194 degrees. In still another embodiment, the full field of view is in the range between 175 degrees and 190 degrees.

In one embodiment, the optical lens may include two lens groups, and the front lens group may include at least one lens with a negative refractive power to enhance light collection capability and achieve a wide field of view, but the invention is not limited thereto. In one embodiment, an F-number of the optical lens is substantially smaller than or equal to 2.0. The rear lens group may have at least one compound lens (such as a cemented lens, a doublet lens or a triplet lens) to correct chromatic aberrations, and a minimum distance between two lenses of a compound lens along an optical axis is smaller than or equal to 0.01 mm. Adjoining surfaces of each two adjacent lenses of the doublet lens, triplet lens or even higher number lens configurations may have an identical or a similar radius of curvature. Further, a total number of lenses with refractive powers in the optical lens may be smaller than nine, such as in the range of six to eight (6-8). In one embodiment, the front lens group may have at least one aspheric lens, and the rear lens group may have has at least one aspheric lens to correct aberrations.

In one embodiment, the optical lens may satisfy a condition of 4 mm<DL<8 mm, LT<15 mm and 0.4<DL/LT<0.8. In other embodiment, the optical lens may satisfy a condition of 0.42<DL/LT<0.78 and a further condition of 0.44<DL/LT<0.76, where DL is a lens diameter of the lens closest to the minified side IS (such as a diameter of the minified-side surface of the sixth lens L6), and LT is a total lens length that is a distance between an optical center of a magnified-side surface of the lens closest to the magnified side (such as the surface S1 of the first lens L1) and an optical center of a minified-side surface of the lens closest to the minified side (such as the surface S12 of the sixth lens L6). Assume the lens diameter DL is fixed, a larger total lens length LT makes miniaturization more difficult, while a shorter total lens length LT increases fabrication complexities. Therefore, meeting the above conditions may achieve a compromise between facilitation of miniaturization and reduction in fabrication complexities.

In one embodiment, the optical lens may satisfy a condition of D1<10 mm, LT<15 mm and 0.5<D1/LT<1.5. In other embodiment, the optical lens may satisfy a condition of 0.52<D1/LT<1.48 and a further condition of 0.54<D1/LT<1.46, where D1 is a lens diameter of the lens closest to the magnified side OS (such as a diameter of the magnified-side surface of the first lens L1), and LT is a total lens length that is a distance between an optical center of a magnified-side surface of the lens closest to the magnified side and an optical center of a minified-side surface of the lens closest to the minified side. Meeting the above conditions may facilitate light converging capability of lenses to reduce the scope of image beams passing through lenses to match the size of a photosensor and thus allow for better optical performance in a limited space.

In one embodiment, the optical lens may satisfy a condition of 1<D1/DL<2, a further condition of 1.02<D1/DL<1.98, and a still further condition of 1.04<D1/DL<1.96, where D1 is a lens diameter of the lens closest to the magnified side, and DL is a lens diameter of the lens closest to the minified side. Meeting the above conditions may avoid an excess volume of the magnified-side part of an optical lens and facilitate light converging capability of lenses to reduce the scope of image beams passing through lenses to match the size of a photosensor.

In one embodiment, the optical lens may satisfy a condition of 1 mm<EFL<2 mm, D1<10 mm, LT<15 mm and 0.15<EFL/LT<0.25. In other embodiment, the optical lens may satisfy a condition of 0.16<EFL/LT<0.24, and a further condition of 0.17<EFL/LT<0.23, where EFL is an effective focal length of the optical lens, and LT is a distance between an optical center of a magnified-side surface of the lens closest to the magnified side and an optical center of a minified-side surface of the lens closest to the minified side. Meeting the above conditions may achieve a compromise between miniaturization and high optical performance and allow for an optimized proportion of a photosensor to a total lens length LT.

Figure 2:
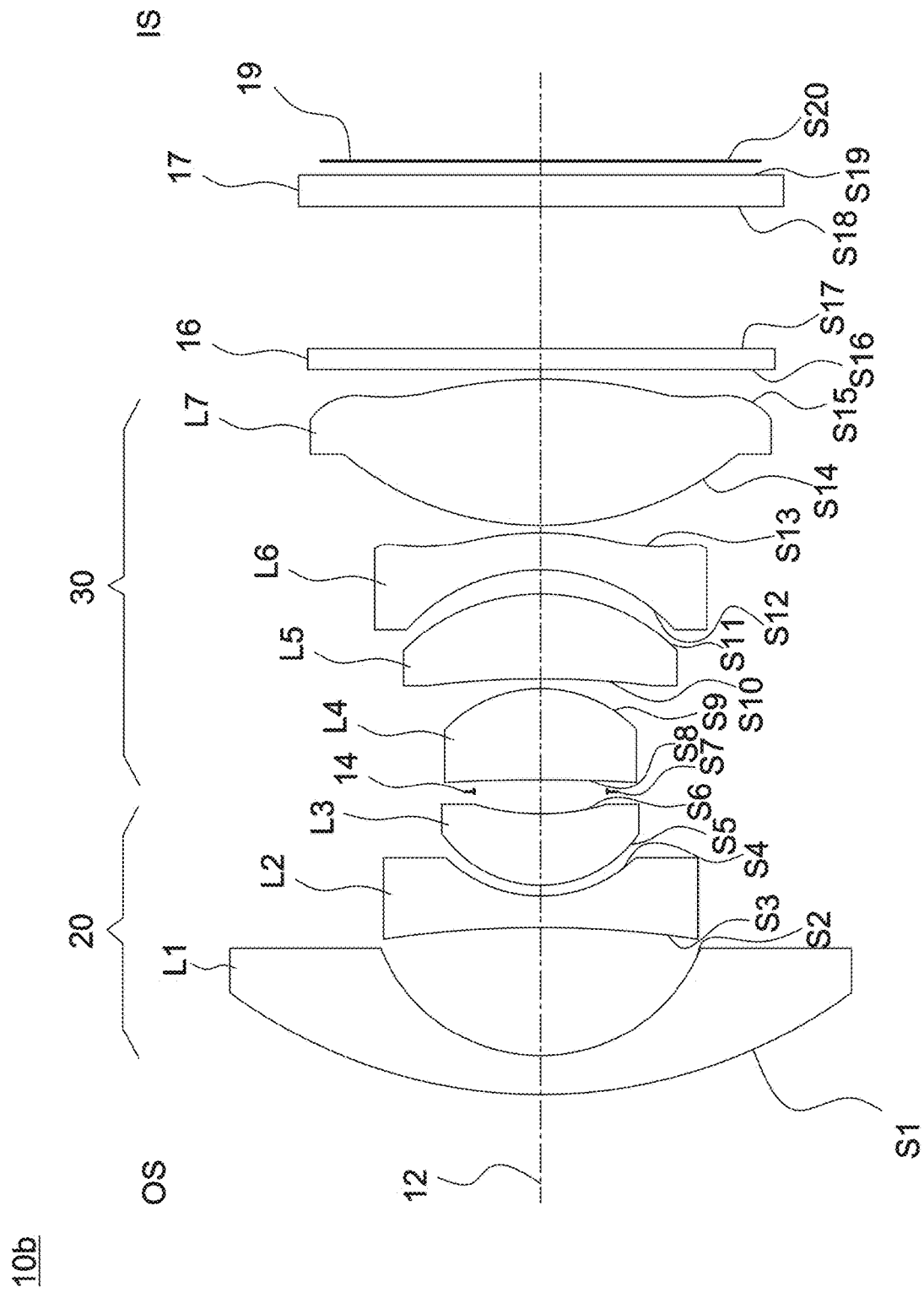
FIG. 2 shows a cross-sectional illustration of an optical lens according to a second embodiment of the invention.

FIG. 2 shows a cross-sectional illustration of an optical lens according to a second embodiment of the invention. As shown in FIG. 2, in this embodiment, the optical lens 10b includes a first lens L1, a second lens L2, a third lens L3, an aperture stop 14, a fourth lens L4, a fifth lens L5, a sixth lens L6 and a seventh lens L7. The first lens L1, the second lens L2 and the third lens L3 form a first lens group 20 with a negative refractive power, and the fourth lens L4, the fifth lens L5, the sixth lens L6 and the seventh lens L7 form a second lens group 30 with a positive refractive power. In this embodiment, the first lens L1, the second lens L2, the third lens L3, the fourth lens L4, the fifth lens L5, the sixth lens L6 and the seventh lens L7 have negative, negative, positive, positive, positive, negative and positive refractive powers, respectively. In this embodiment, the optical lens 10b includes at least one glass lens; for example, the first lens L1 is a glass lens, and the fourth lens L4 is a molded glass lens. In this embodiment, the optical lens 10b includes at least one plastic lens. In this embodiment, the second lens L2, the third lens L3, the fourth lens L4, the fifth lens L5, the sixth lens L6 and the seventh lens L7 are aspheric lenses, and no compound lens is provided in the optical lens 10b, but the invention is not limited thereto. In this embodiment, the first lens L1 (closest to the magnified side among all lenses of the optical lens) has a lens diameter D1 of 7.8 mm, and the seventh lens L7 (closest to the minified side among all lenses of the optical lens) has a lens diameter DL of 5.8 mm. Detailed optical data, design parameters and aspheric coefficients of the optical lens 10b are shown in Table 3 below.

TABLE 3

EFL: 1.85 mm
F#: 2
full FOV: 194 degrees
TTL: 12.8 mm
semi-diagonal image height: 3.08 mm
D1: 7.8 mm
DL: 5.8 mm
LT: 9.78 mm
DL/LT: 0.59
EFL/LT: 0.19

| Surface | Radius (mm) | Interval (mm) | Refractive index | Abbe number | Object description |
|---|---|---|---|---|---|
| 1 | 7.32 | 0.55 | 1.78 | 44 | meniscus (L1) |
| 2 | 2.42 | 1.74 | | | |
| 3* | −5.44 | 0.46 | 1.54 | 56 | aspheric (L2) |
| 4* | 1.93 | 0.16 | | | |
| 5* | 1.81 | 1.00 | 1.64 | 24 | aspheric (L3) |
| 6* | 5.65 | 0.24 | | | |
| 7 | inf. | 0.25 | | | aperture stop 14 |
| 8* | −9.79 | 1.27 | 1.61 | 58 | aspheric (L4) |
| 9* | −1.59 | 0.10 | | | |
| 10* | −16.85 | 1.21 | 1.54 | 56 | aspheric (L5) |
| 11* | −5.37 | 0.35 | | | |
| 12* | −1.09 | 0.51 | 1.67 | 19 | aspheric (L6) |
| 13* | −2.62 | 0.10 | | | |
| 14* | 2.24 | 2.06 | 1.54 | 56 | aspheric (L7) |
| 15 | −4.62 | 0.12 | | | |
| 16 | inf. | 0.30 | 1.52 | 64 | light filter 16 |
| 17 | inf. | 2.00 | | | |
| 18 | inf. | 0.4 | 1.52 | 64 | cover glass 17 |
| 19 | inf. | 0.2 | | | |
| 20 | | 0 | | | image plane 19 |

In the above Table 3, an interval of the surface S1 is a distance between the surface S1 and the surface S2 along the optical axis 12, an interval of the surface S2 is a distance between the surface S2 and the surface S3 along the optical axis 12, and an interval of the surface S19 is a distance between the surface S19 and the image plane 19 along the optical axis 12.

Table 4 lists aspheric coefficients and conic constant of each aspheric surface of the optical lens 10b according to the second embodiment of the invention.

TABLE 4

| Surface | S3 | S4 | S5 | S6 | S8 | S9 |
|---|---|---|---|---|---|---|
| K | 0.00 | −9.569022 | −2.627525 | −3.186289 | −43.33286 | −0.085047 |
| A | 4.32E−02 | 1.18E−01 | −4.28E−04 | 4.36E−02 | −2.30E−02 | 4.98E−02 |
| B | −1.63E−02 | −6.56E−02 | 4.58E−04 | −7.56E−03 | −2.31E−03 | −2.51E−02 |
| C | 4.03E−03 | 6.48E−02 | −1.00E−02 | 9.16E−02 | 2.42E−03 | 1.77E−02 |
| D | −5.29E−04 | −4.19E−02 | −7.82E−03 | −1.25E−01 | 0 | −7.38E−03 |
| E | 2.73E−05 | 1.35E−02 | 6.72E−03 | 7.62E−02 | 0 | 1.46E−03 |

| Surface | S10 | S11 | S12 | S13 | S14 | S15 |

TABLE 4-continued

| | | | | | | |
|---|---|---|---|---|---|---|
| K | 0 | 5.7853533 | −3.303366 | −13.139 | −0.793063 | 0.6975533 |
| A | 1.72E−02 | −9.24E−02 | −1.26E−02 | 4.06E−02 | −5.80E−02 | 1.09E−02 |
| B | −1.50E−02 | 6.26E−02 | 4.45E−02 | −5.30E−02 | 2.25E−02 | 2.66E−04 |
| C | 9.78E−03 | −4.04E−02 | −5.56E−02 | −6.57E−03 | −6.68E−03 | 6.51E−04 |
| D | −4.18E−03 | 1.90E−02 | 3.46E−02 | 4.11E−03 | 1.37E−03 | −2.58E−04 |
| E | 6.92E−04 | −5.50E−03 | −1.19E−02 | −1.07E−03 | −1.80E−04 | 4.41E−05 |
| F | 0 | 8.51E−04 | 2.16E−03 | 1.37E−04 | 1.36E−05 | −3.78E−06 |
| G | 0 | −5.03E−05 | −1.65E−04 | −7.19E−06 | −4.49E−07 | 1.26E−07 |

Figure 3:
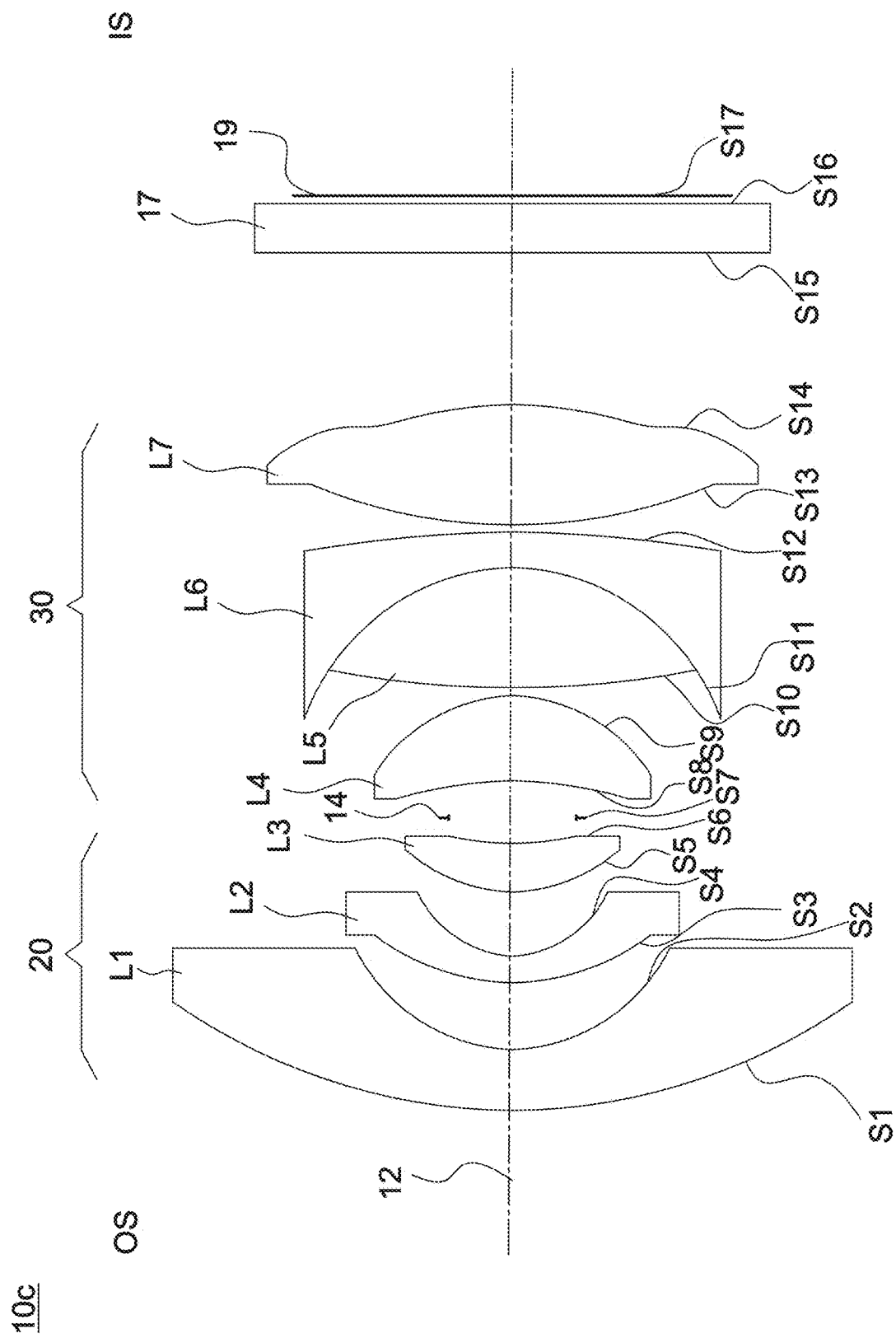
FIG. 3 shows a cross-sectional illustration of an optical lens according to a third embodiment of the invention.

FIG. 3 shows a cross-sectional illustration of an optical lens according to a third embodiment of the invention. As shown in FIG. 3, in this embodiment, the optical lens 10c includes a first lens L1, a second lens L2, a third lens L3, an aperture stop 14, a fourth lens L4, a fifth lens L5, a sixth lens L6 and a seventh lens L7. The first lens L1, the second lens L2 and the third lens L3 form a first lens group 20 with a negative refractive power, and the fourth lens L4, the fifth lens L5, the sixth lens L6 and the seventh lens L7 form a second lens group 30 with a positive refractive power. In this embodiment, the first lens L1, the second lens L2, the third lens L3, the fourth lens L4, the fifth lens L5, the sixth lens L6 and the seventh lens L7 have negative, negative, positive, positive, positive, negative and positive refractive powers, respectively. In this embodiment, the cover glass 17 is provided with a filtering element to thus omit an independent light filter 16. In this embodiment, the optical lens 10c includes at least one glass lens. In this embodiment, the optical lens 10b includes at least one plastic lens. In this embodiment, the second lens L2, the third lens L3, the fourth lens L4 and the seventh lens L7 are aspheric lenses, and the fifth lens L5 and the sixth lens L6 are fit together to form a cemented doublet, but the invention is not limited thereto. In this embodiment, the first lens L1 (closest to the magnified side among all lenses of the optical lens) has a lens diameter D1 of 8.34 mm, and the seventh lens L7 (closest to the minified side among all lenses of the optical lens) has a lens diameter DL of 5.9 mm. Detailed optical data, design parameters and aspheric coefficients of the optical lens 10c are shown in Table 5 below.

TABLE 5

EFL: 1.8 mm
F#: 2
full FOV: 196 degrees
TTL: 13 mm
semi-diagonal image height: 3.084 mm
D1: 8.34 mm
DL: 5.9 mm
LT: 9.86 mm
DL/LT: 0.6
EFL/LT: 0.18

| Surface | Radius (mm) | Interval (mm) | Refractive index | Abbe number | Object description |
|---|---|---|---|---|---|
| 1 | 8.54 | 0.85 | 1.88 | 40.8 | meniscus (L1) |
| 2 | 2.38 | 0.95 | | | |
| 3* | 4.06 | 0.40 | 1.54 | 55.7 | aspheric (L2) |
| 4* | 1.62 | 0.90 | | | |
| 5* | 3.84 | 0.69 | 1.64 | 23.5 | aspheric (L3) |
| 6* | 9.61 | 0.21 | | | |
| 7 | Inf. | 0.64 | | | aperture stop 14 |
| 8* | −6.66 | 1.19 | 1.80 | 40.7 | aspheric (L4) |
| 9* | −2.40 | 0.10 | | | |
| 10 | 12.51 | 1.71 | 1.7 | 55.5 | biconvex (L5) |
| 11 | −3.08 | 0.50 | 1.99 | 16.5 | meniscus (L6) |
| 12 | −18.16 | 0.10 | | | |
| 13* | 23.02 | 1.61 | 1.54 | 55.7 | aspheric (L7) |

TABLE 5-continued

EFL: 1.8 mm
F#: 2
full FOV: 196 degrees
TTL: 13 mm
semi-diagonal image height: 3.084 mm
D1: 8.34 mm
DL: 5.9 mm
LT: 9.86 mm
DL/LT: 0.6
EFL/LT: 0.18

| Surface | Radius (mm) | Interval (mm) | Refractive index | Abbe number | Object description |
|---|---|---|---|---|---|
| 14* | −3.82 | 2.24 | | | |
| 15 | Inf. | 0.70 | 1.52 | 64 | cover glass (with filtering element) 17 |
| 16 | Inf. | 0.20 | | | |
| 17 | Inf. | 0 | | | image plane 19 |

In the above Table 5, an interval of the surface S1 is a distance between the surface S1 and the surface S2 along the optical axis 12, an interval of the surface S2 is a distance between the surface S2 and the surface S3 along the optical axis 12, and an interval of the surface S16 is a distance between the surface S16 and the image plane 19 along the optical axis 12.

Table 6 lists aspheric coefficients and conic constant of each aspheric surface of the optical lens 10c according to the third embodiment of the invention.

TABLE 6

| Surface | S3 | S4 | S5 | S6 |
|---|---|---|---|---|
| K | 0 | 0 | 0 | 0.0383594 |
| A | 8.14E−02 | 1.16E−01 | 3.19E−02 | −5.35E−03 |
| B | −4.61E−02 | −5.33E−02 | 2.47E−03 | 3.15E−02 |
| C | 1.90E−02 | 1.13E−02 | 1.01E−02 | −1.21E−02 |
| D | −6.22E−03 | 4.27E−03 | −2.62E−03 | 0 |
| E | 1.28E−03 | −8.24E−04 | 0 | 0 |
| F | −1.49E−04 | −8.64E−04 | 0 | 0 |
| G | 7.98E−06 | 0 | 0 | 0 |

| Surface | S8 | S9 | S13 | S14 |
|---|---|---|---|---|
| K | 0 | 0 | 0 | 0 |
| A | −1.28E−03 | 3.43E−03 | 1.74E−02 | 2.20E−02 |
| B | −4.62E−03 | −1.63E−03 | −2.41E−03 | −3.11E−05 |
| C | 1.24E−03 | −2.18E−04 | 2.89E−04 | −1.67E−04 |
| D | 0 | 0 | −2.97E−05 | 1.56E−05 |
| E | 0 | 0 | 1.87E−06 | −1.34E−06 |
| F | 0 | 0 | −7.64E−08 | 5.27E−08 |

Figure 4:
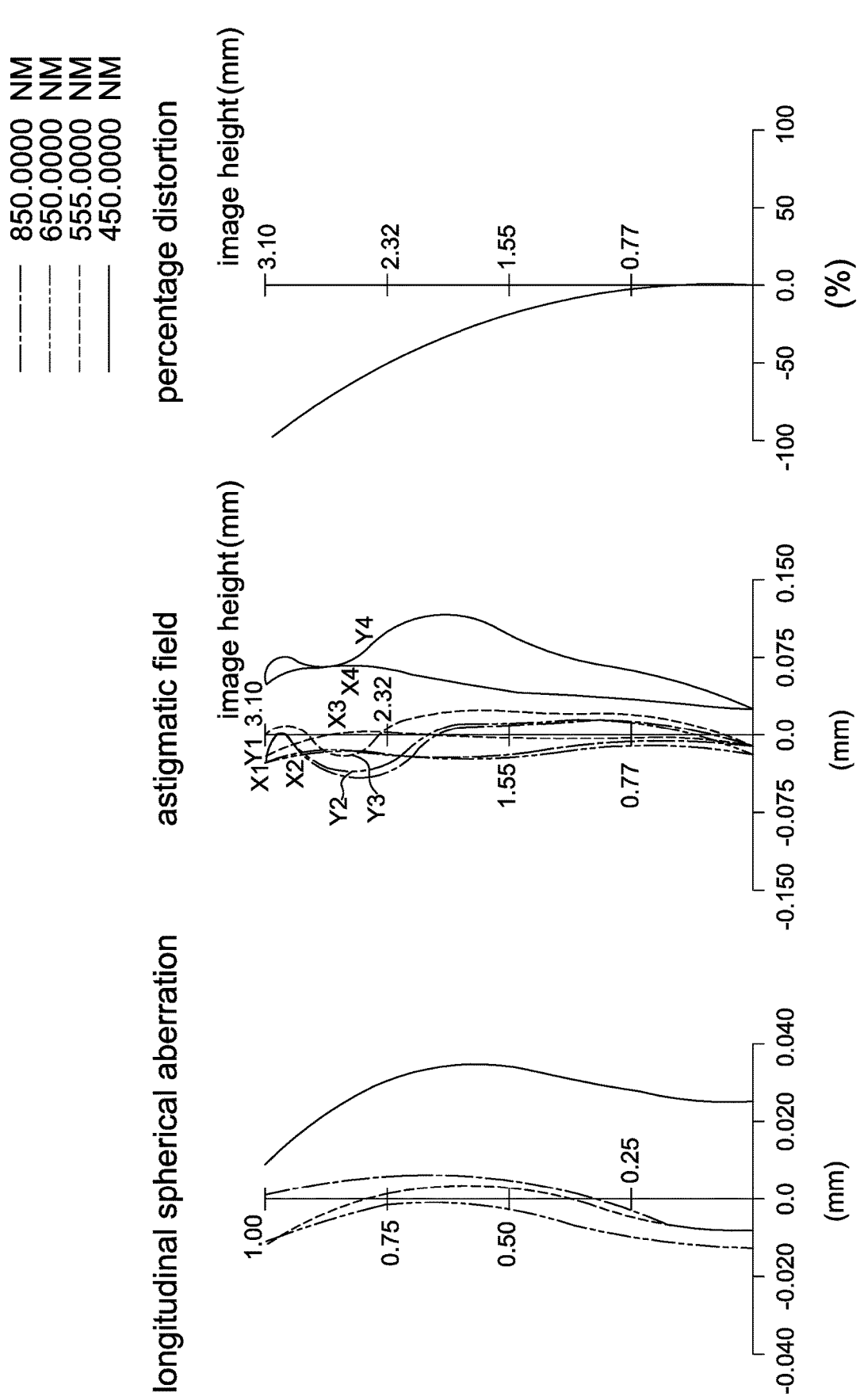
FIG. 4 shows a longitudinal spherical aberration curve, an astigmatic field curve and a percentage distortion curve of the optical lens shown in FIG. 1.
Figure 5:
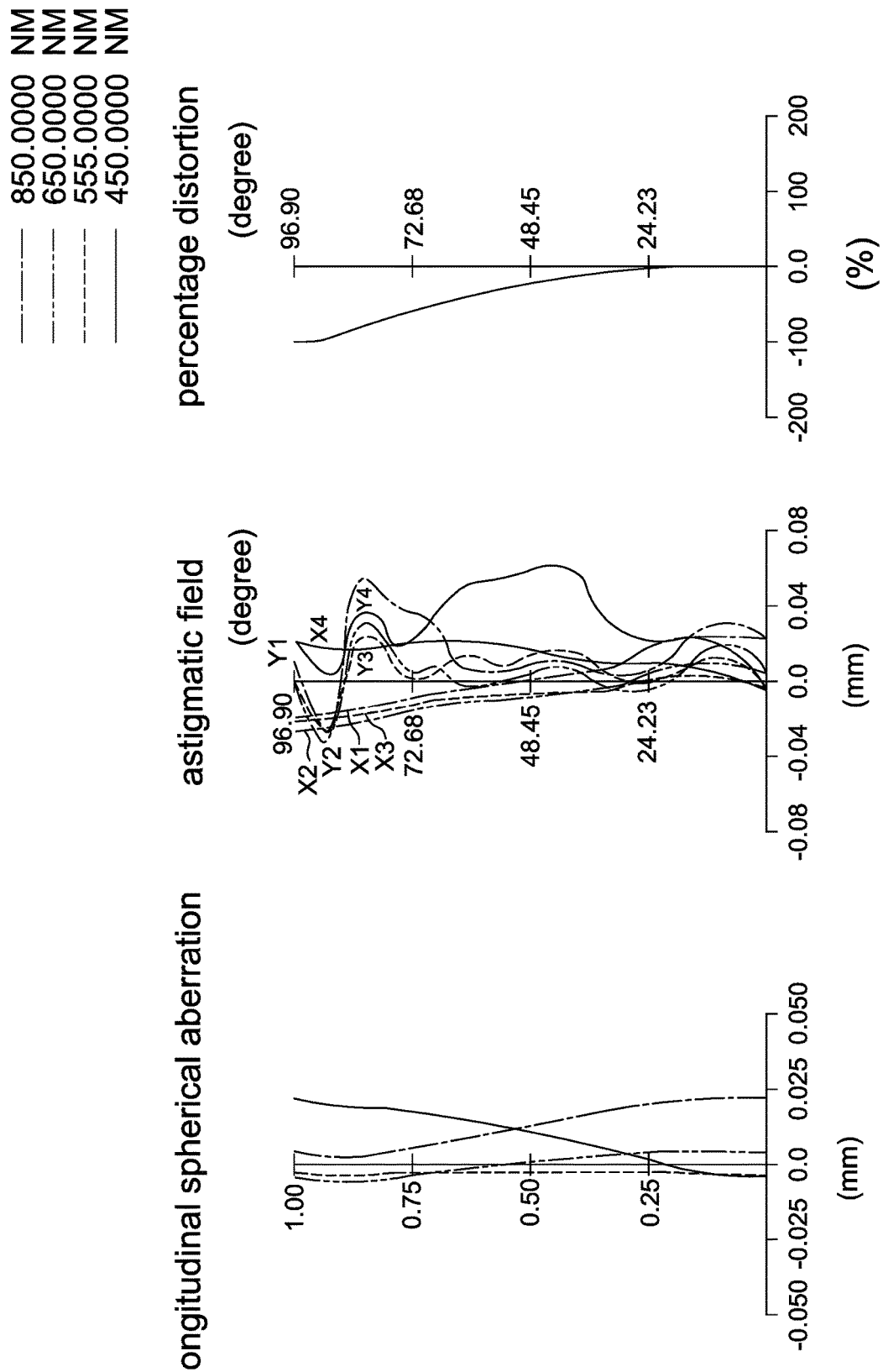
FIG. 5 shows a longitudinal spherical aberration curve, an astigmatic field curve and a percentage distortion curve of the optical lens shown in FIG. 2.
Figure 6:
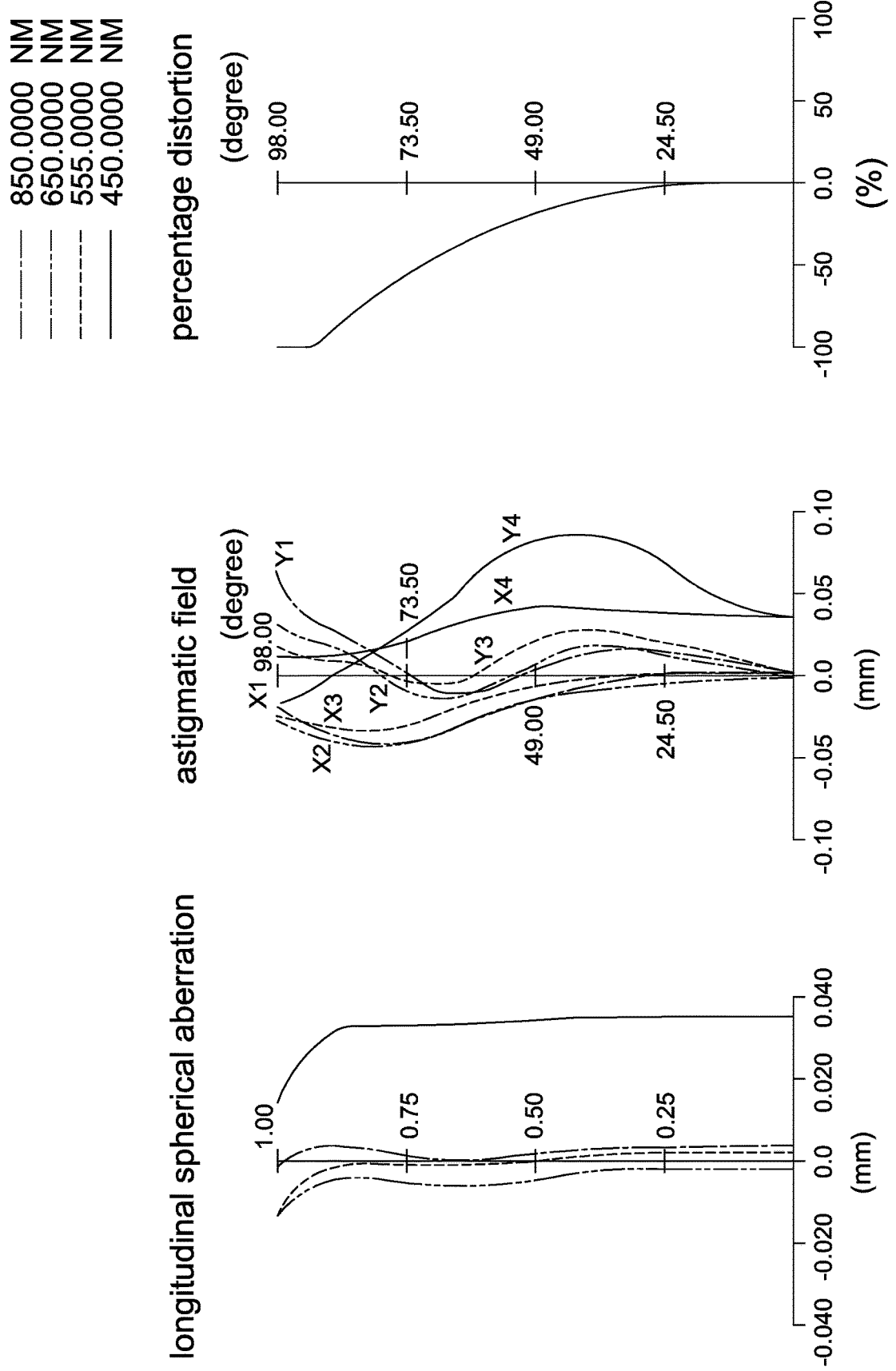
FIG. 6 shows a longitudinal spherical aberration curve, an astigmatic field curve and a percentage distortion curve of the optical lens shown in FIG. 3.

FIG. 4 shows a longitudinal spherical aberration curve, an astigmatic field curve and a percentage distortion curve of the optical lens 10a. FIG. 5 shows a longitudinal spherical aberration curve, an astigmatic field curve and a percentage distortion curve of the optical lens 10b. FIG. 6 shows a longitudinal spherical aberration curve, an astigmatic field curve and a percentage distortion curve of the optical lens 10c. The simulated results shown in FIGS. 4-6 are within permitted ranges specified by the standard, which indicates the above embodiment of the optical lens 10a-10c may achieve good imaging quality.

According to the above embodiments, the optical lens may achieve good imaging quality, wide viewing angles, wide operating temperature ranges and low fabrication costs.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, two glass spherical lenses may be replaced with a plastic aspheric lens to reduce fabrication costs and number of lenses, or two spherical lenses may be replaced with an aspheric lens to reduce weight. Besides, the total number of lenses may be increased to enhance image resolution, or a single lens may be replaced with a cemented lens to correct chromatic aberrations. It is intended that the scope of the invention be defined by the claims appended hereto and their equivalents in which all terms are meant in their broadest reasonable sense unless otherwise indicated.

What is claimed is:

1. An optical lens comprising a first lens group, an aperture stop and a second lens group arranged in order from a magnified side to a minified side, the first lens group having at least one glass lens and at least one aspheric lens in order from the magnified side to the minified side, the second lens group having at least four lenses that includes at least one aspheric lens, the second lens group having a positive refractive power, a total number of lenses with refractive powers in the optical lens being smaller than nine, and the optical lens satisfying the following conditions:
   1 mm<EFL<2 mm, D1<10 mm, LT<15 mm and 0.15<EFL/LT<0.25, where EFL is an effective focal length of the optical lens, D1 is a lens diameter of a lens of the optical lens closest to the magnified side, and LT is a distance between an optical center of a magnified-side surface of the lens closest to the magnified side and an optical center of a minified-side surface of the lens closest to the minified side.

2. The optical lens as claimed in claim 1, wherein the optical lens has six lenses, and the six lenses of the optical lens have respective refractive powers of negative, negative, positive, positive, negative and positive in order from the magnified side to the minified side.

3. The optical lens as claimed in claim 1, wherein the optical lens has seven lenses, and the seven lenses of the optical lens have respective refractive powers of negative, negative, positive, positive, positive, negative and positive in order from the magnified side to the minified side.

4. The optical lens as claimed in claim 1, wherein a lens of the first lens group closest to the magnified side is the at least one glass lens, and a lens of the second lens group closest to the magnified side is a glass lens.

5. The optical lens as claimed in claim 1, wherein a full field of view of the optical lens is in the range between 170 degrees and 196 degrees.

6. The optical lens as claimed in claim 1, wherein a semi-diagonal image height of the optical lens is 3.08-3.088 mm.

7. The optical lens as claimed in claim 1, wherein the optical lens satisfies a condition of 0.4<DL/LT<0.8, where DL is a lens diameter of a lens of the optical lens closest to the minified side.

8. The optical lens as claimed in claim 1, wherein the optical lens includes at least one glass lens and at least one plastic lens.

9. The optical lens as claimed in claim 1, wherein a distance along an optical axis between an image plane and a lens surface of the optical lens closest to the magnified side is smaller than or equal to 13 mm.

10. The optical lens as claimed in claim 1, wherein an effective focal length of the optical lens is 1.80-1.85 mm.

11. The optical lens as claimed in claim 1, wherein the optical lens comprises at least one compound lens, and a ratio of a difference in radius of curvature between each two adjoining lens surfaces of the compound lens to a larger value of radius of curvature among the two adjoining lens surfaces is smaller than 0.1%.

12. The optical lens as claimed in claim 1, wherein the optical lens satisfies a condition of 0.5<D1/LT<1.5.

13. The optical lens as claimed in claim 1, wherein the optical lens have respective shapes of meniscus, aspheric, meniscus, plano-convex, meniscus and aspheric in order from the magnified side to the minified side.

14. The optical lens as claimed in claim 1, wherein the optical lens has seven lenses, and the seven lenses of the optical lens have respective shapes of meniscus, aspheric, aspheric, aspheric, aspheric, aspheric and aspheric in order from the magnified side to the minified side.

15. The optical lens as claimed in claim 1, wherein the optical lens has seven lenses, and the seven lenses of the optical lens have respective shapes of meniscus, aspheric, aspheric, aspheric, biconvex, meniscus and aspheric in order from the magnified side to the minified side.

* * * * *